W. D. Clark.
Farm-Gate.
N° 72976. Patented Jan. 7, 1868.
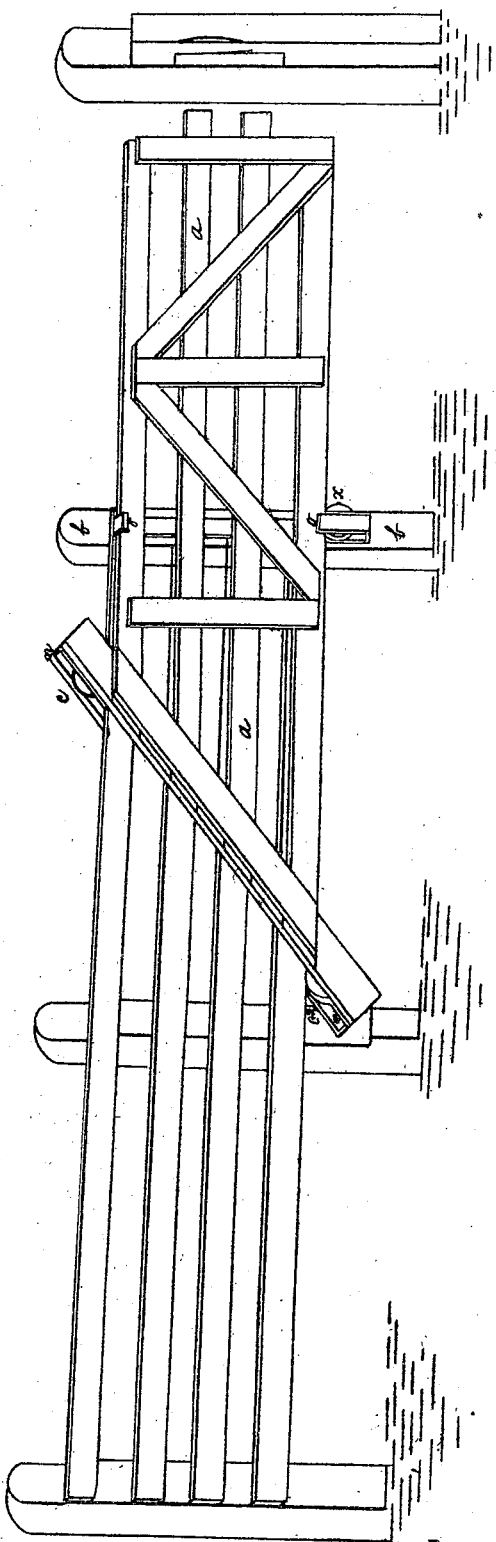
Witnesses
Inventor
William D Clark

United States Patent Office.

WILLIAM D. CLARK, OF OTTAWA, ILLINOIS.

Letters Patent No. 72,976, dated January 7, 1868.

IMPROVEMENT IN FARM-GATES.

The Schedule referred to in these Letters Patent and making part of the same.

Be it known that I, WILLIAM D. CLARK, of the city of Ottawa, in La Salle county, and State of Illinois, have invented a new and useful Improvement in Farm-Gates; and I do hereby declare that the following is a full, clear, and exact description of the same, reference being had to the annexed drawing, making a part of this specification, representing a perspective view of the same.

$a\ a$ represent the gate as it appears when a little way open. The gate is constructed of boards, fastened together with cleats, in the usual way, the inner end of the gate extending beyond the hinge-post $b$, and bevelled, as shown. At both the upper and lower corners of the inner end of the gate are friction-rollers $c$ and $c^2$, in the guides $n\ n$, that project behind the upper and lower boards of the fence, for the purpose of holding the gate in its place on the fence. The friction-roller $x$ helps to sustain the weight of the gate, acting conjointly with the rollers $c$ and $c^2$. It will be seen that, by this disposition of the rollers $c$ and $c^2$, the strain upon the boards of the fence is placed, when the gate is closed, near where they are nailed to the posts, so that the gate has greater steadiness than if the strain were midway between the post. Also, the roller $c^2$, with its guide, keeps that lower corner from swaying to and fro when the gate is a little open. The metal guides $o\ o$ hold the gate in its place on the post $b$. The placing of the roller $c^2$ so far from the roller $x$ takes a great portion of the weight off the roller $x$, so that the lower board of the gate will not wear out so soon.

I am aware of previous use of gates similar in looks, but none having the peculiar advantages described.

What I claim as new in my invention, and desire to secure by Letters Patent, is—

The peculiar and particular arrangement of the guides and rollers described, when attached to the gate, operating and constructed as set forth.

WILLIAM D. CLARK.

Witnesses:
THOS. H. HUTCHINS,
F. B. COCHRANE.